John H. Martin's Harness Tree.

117309

PATENTED JUL 25 1871

Inventor
John H. Martin
by
Mason Fenwick & Lawrence

Witnesses:
R. T. Campbell
J. N. Campbell

UNITED STATES PATENT OFFICE.

JOHN H. MARTIN, OF COLUMBUS, OHIO.

IMPROVEMENT IN HARNESS SADDLE-TREES.

Specification forming part of Letters Patent No. 117,309, dated July 25, 1871.

*To all whom it may concern:*

Be it known that I, JOHN H. MARTIN, of Columbus, in the county of Franklin and State of Ohio, have invented certain new and useful Improvements in Harness-Trees; and I do hereby declare that the following is a full, clear, and exact description thereof, reference being had to the accompanying drawing making part of this specification, in which—

Figure 1:
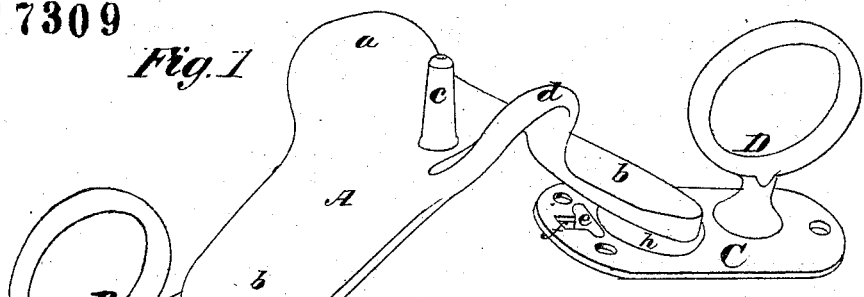
Figure 2:
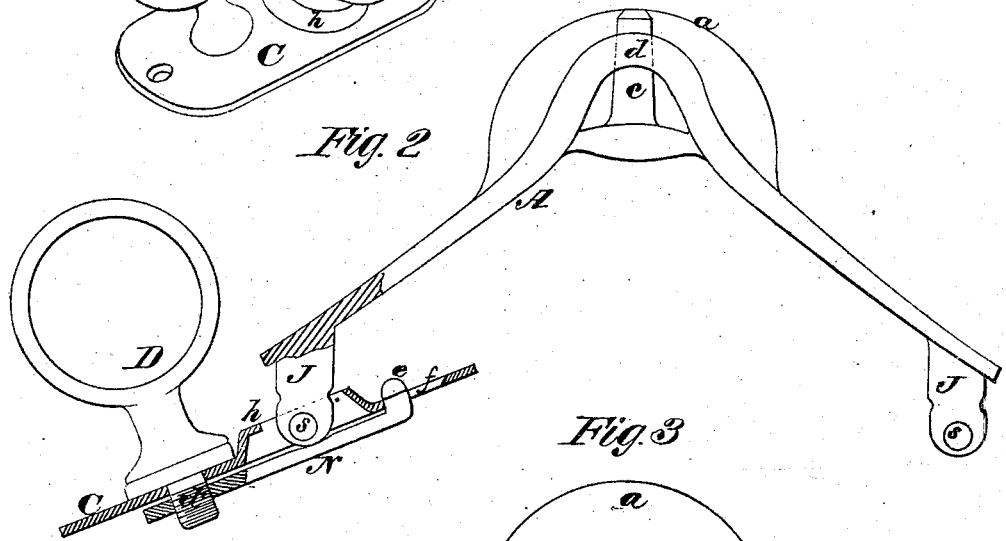
Figure 3:
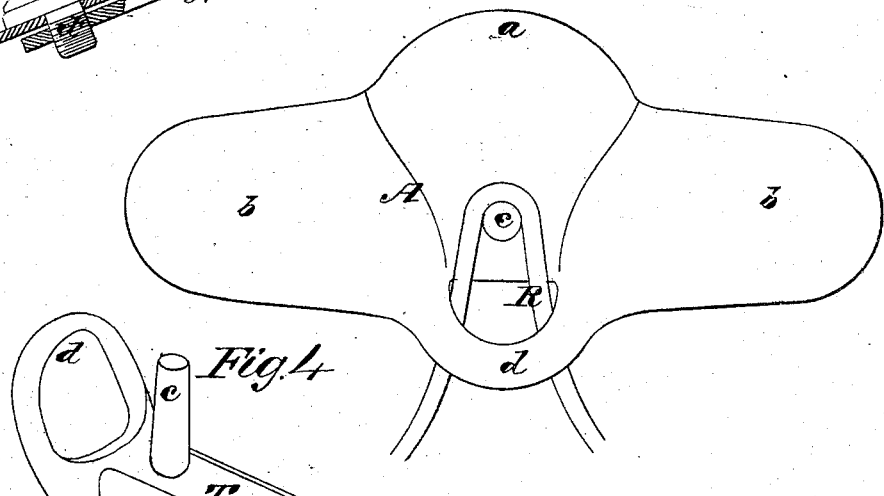
Figure 4:
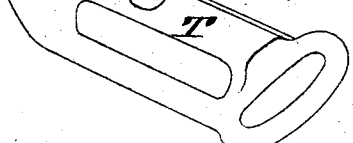

Figure 1 is a perspective view of the harness-tree as improved. Fig. 2 is a front view, partly in section, and having one of the terrets and pad-plates removed. Fig. 3 is a top view, showing a check-line applied to it. Fig. 4 is a perspective view of the line-holder adapted for a leather pad.

Similar letters of reference indicate corresponding parts in the several figures.

The object of this invention is to improve harness-trees or pads for light harness—1st, by the combination of a post or stud with a loop in such manner as to form a check-line holder which will be much stronger and cheaper than hooks hitherto used for this purpose, and which will safely hold the line in place, and, in a measure, prevent the animal from throwing his head from side to side. 2d, by the combination of the terrets or line-rings with pad-plates in such manner that the terrets serve as the fastenings, and are also set at a more desirable distance from the check-line holder, as will be hereinafter explained.

The following description of my invention will enable others skilled in the art to understand it.

Rising from the center of the tree A is a post, c, and in front of this post is a loop, d. These parts constitute the improved check-line holder and receive the check-line R, as shown in Fig. 3. The line R is passed through the loop d from before backward, and over the post or stud c. The loop will in this manner hold the line down in place and prevent the animal throwing it off the post. The loop d also affords lateral bearings for the line, and prevents the animal from readily turning his head. In the drawing, Figs. 1, 2, and 3, the loop d is represented as cast with the saddle a and side pieces b b. The post c may be cast, screwed, or riveted to the tree. In Fig. 4 I have represented the loop and post cast upon a frame, T, thus adapting the holder for a leather pad where no tree is used. The pad-plates C are provided with clamp-plates N, and constructed as described in my Letters Patent bearing date on the 11th day of April, 1871, and the ends of the tree are constructed with T-shaped heads J, the extensions s, of which form pivots for the plates C, as described in my Letters Patent above referred to. The plate N has a hook, e, formed on one end, and a screw-threaded hole through the other end. The hooked end is inserted through a slot, f, after the T-head J is adjusted into the cup h on plate C, and, by means of a screw-threaded portion, d', on the terret D, the plate N is clamped more or less firmly between the plates C and N, as shown in Fig. 2.

I do not claim the plates N C and T-shaped heads J under this application, as I have described these parts in my Letters Patent above referred to, but they were not secured together by means of screws formed on the terrets, as I have herein described.

By arranging the terrets on the pad-plates they not only serve as fastenings for these plates, but they are set much further from the line-holder, thus holding the lines off from the shoulders of the animal and giving a clear straight line from the hands of the driver to the bit.

Having described my invention, what I claim as new, and desire to secure by Letters Patent, is—

1. The guard-loop d, formed with the frame A or T, substantially as and for the purpose described.

2. The combination of the terret D, the plates C N, and the T-shaped pivotal heads J, substantially as described.

JOHN H. MARTIN.

Witnesses:
L. E. WILSON,
FRANK WILSON.